Patented Feb. 12, 1952

2,585,555

UNITED STATES PATENT OFFICE 2,585,555

DERIVATIVES OF BIS-(1-AMINO-ANTHRA-QUINONE-6-SULFO)-PIPERAZID

Walter Jenny, Basel, and Walter Kern, Sissach, Switzerland, assignors to Ciba Limited, a Swiss firm No Drawing. Original application December 18, 1947, Serial No. 792,616. Divided and this application January 25, 1951, Serial No. 207,833. In Switzerland December 21, 1946

4 Claims. (Cl. 260—268)

This application is a division of our copending application Serial No. 792,616, filed on December 18, 1947 (now U. S. Patent No. 2,543,411).

Under the present invention, valuable vat dyestuffs are made by converting in an anthraquinone derivative, on the one hand, a β-positioned sulfonic acid group or a reactive derivative thereof, into a sulfonic acid amide group and, on the other hand, a suitable substituent attached to the anthraquinone radical into a carboxylic acid amide group whose nitrogen atom is linked to the anthraquinone nucleus.

The starting products for the present process therefore must contain, on the one hand, at least one sulfonic acid group or a reactive derivative thereof, such as a sulfonic acid halide, especially a sulfochloride group in β-position. The transformation of such a sulfonic acid group into a sulfonic acid amide group can be effected conveniently by first transforming a sulfonic acid group into a reactive derivative thereof, if such a reactive derivative is not present right from the beginning. The reaction between sulfonic acid halides, especially sulfochlorides, with ammonia or primary or secondary amines may be carried out as a rule at comparatively low temperature, if desired, with gentle warming. Depending on the amines used an excess thereof may be used as solvent or the reaction may be carried out in an indifferent diluent or solvent. In many instances especially good results are obtained if the said sulfonic acids or the sulfonic acid halide groups are transformed into sulfonic acid amide groups which carry 2 alkyl radicals attached to the nitrogen atom. This can be effected easily by reacting the sulfonic acid halides with secondary aliphatic amines, for example, dimethylamine, diethylamine, or diethanolamine. In some cases it is also possible to alkylate the sulfonic acid amides which are first formed and which do not carry an alkyl group at the nitrogen atom or contain at most one such alkyl group, whereby the corresponding N-dialkylsulfamides are obtained. In the dialkylsulfamides mentioned above both alkyl groups may be completely separated from each other or they may be interconnected to form an isocyclic or heterocyclic ring. Thus, for example, by reacting sulfochlorides with piperidine, sulfopiperidides, or by reacting sulfochloride with morpholine, sulfomorpholides, are obtained.

For the transformation of sulfonic acid groups into sulfonic acid amide groups one may also use amines which carry more than 1, for example 2, amino groups which are interconnected for instance by an aliphatic radical or may form part of a heterocyclic ring, for example, a piperazine ring.

Besides the transformation of sulfonic acid groups into sulfonic acid amide groups as described above the present process comprises a reaction which consists in transforming a suitable substituent in the anthraquinone nucleus into a carboxylic acid amide group in such a manner that its nitrogen atom is directly bound to the anthraquinone radical. Substituents suitable for such transformation are of course amino groups which can be acylated in the usual manner. As the presence of free amino groups might interfere with the transformation of sulfonic acid groups into sulfonic acid amide groups described above it is often necessary to carry out the second mentioned reaction in a round-about way. In the vattable starting product the amino group may not be present or it may be present in such a form that a disturbing side-reaction cannot occur. For instance, the starting product may contain, besides the sulfonic acid group to be transformed into a sulfonic acid amide group, a nitro group which at a given moment may be reduced to an amino group and may subsequently be acylated. As an alternative, the starting product may contain a replaceable halogen atom which at a suitable moment is replaced by an amino group, or such a replaceable halogen atom may be reacted with a carboxylic acid amide to form the corresponding carboxylic acid amide group, the nitrogen atom of which is directly attached to a vattable radical.

The two reactions necessary for the present process, viz. the transformation of the sulfonic acid group (or its reactive derivative) into a sulfonic acid amide group and the introduction of an acylamino group into an anthraquinone radical, may be carried out in any desired sequence. In many cases, it will be convenient first to carry out the first mentioned reaction, thereafter reducing a nitro group initially present in, or subsequently introduced into, the molecule to an amino group and to acylate the latter.

The carboxylic acids or the functional derivatives thereof (especially halides) intended for the acylation of amino groups may belong to the aliphatic, aromatic or heterocylic series. Especially good results are obtained in many instances by using aromatic carboxylic acids, such as benzoic acid or substituted benzoic acids, for example alkyl, halogen or cyanbenzoic acids, wherein often a p-positioned substituent is preferable. If desired, polyvalent carboxylic acid, for example, benzenedicarboxylic acids such as terephthalic acid and isophthalic acid may be reacted with vattable compounds of the kind described above in such a manner that each carboxylic group of the acid used leads to the formation of a carboxylic acid amide group. The reaction of the carboxylic acids used with the amines of vattable compounds may be carried out by using the corresponding acid chloride at an elevated temperature in high boiling solvents or diluents such as mono-, di- or trichlorobenzene, nitrobenzene or naphthalene.

Especially valuable products may be obtained according to the process by converting nitroanthraquinone-sulfonic acids whose nitro group is bound, for example, to a 1-position and whose sulfonic acid group is bound to one of the positions 6 and 7, i. e. in the benzene nucleus of the anthraquinone not containing the nitro group, into the corresponding sulfonamides. The nitro group is then reduced and the amino group thus obtained is acylated.

The products obtained according to the present process are vat dyestuffs which carry as substituents in β-position in an anthraquinone nucleus at least one sulfonic acid amide group and furthermore at least one carboxylic acid amide group, the nitrogen atom of which is directly attached to the anthraquinone radical. In these vat dyestuffs the sulfonic acid amide groups may carry advantageously two alkyl radicals bound to the nitrogen atom and these alkyl radicals may be interconnected to form a ring.

The present products may be used in known manner for dyeing and printing various fibers, especially cellulosic fibers, and also as pigments. There are obtained, inter alia, for example, violet, and also valuable, pure yellow shades of good fastness.

The following examples illustrate the invention without limiting its scope. The parts are parts by weight unless otherwise stated.

*Example 1*

To a solution of 1-nitro-anthraquinone-6-sulfochloride (1 molecular proportion) [obtainable by reacting phosphorus pentachloride and phosphorus oxychloride with sodium 1-nitroanthraquinone-6-sulfonate] in acetone, 2 molecular proportions of dimethyl amine are added slowly with good stirring at 0–5° C. After the whole has been kept for 3 hours while stirring at 40° C. the mixture is cooled down, filtered and washed well with warm water, alcohol and ether. The product obtained forms, when recrystallized from benzene, pale yellow needles or laminae melting at 271–272° C. (uncorrected). By reduction by means of an aqueous sodium sulfohydrate solution 1-aminoanthraquinone - 6 - sulfodimethylamide is obtained which, after recrystallization from chlorobenzene, forms beautiful red crystals melting at 237–239° C. (uncorrected).

17 parts of 1-amino-anthraquinone-6-sulfodimethylamide thus obtained are suspended in 900 parts of dry chlorobenzene, 30 parts of para-chlorobenzoylchloride added and the whole is boiled for 3 hours with reflux cooling. The dyestuff, which on cooling crystallizes to form yellow needles, is suction-filtered and well washed with hot alcohol. It corresponds to the formula

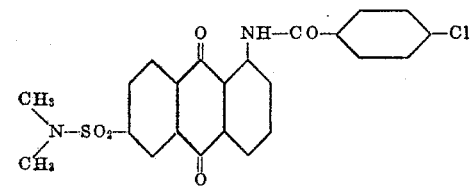

and dyes cotton from a red-brown vat in pure greenish yellow shades.

The reaction may also be carried out in other solvents such as ortho-dichlorobenzene, trichlorobenzene or nitrobenzene.

*Example 2*

22 parts of 1-amino-anthraquinone-6-sulfodimethylamide (see Example 1, paragraph 1) are suspended in 1000 parts of dry chlorobenzene and 7 parts of terephthalic acid dichloride are added. The whole is kept gently boiling for 3 hours. The dyestuff, which on cooling separates in yellow needles, is suction-filtered and well washed with boiling alcohol. It corresponds to the formula

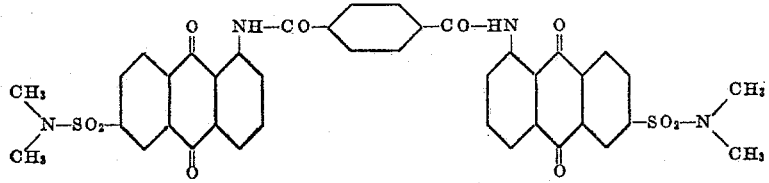

and dyes cotton from a dark brown vat in strong, pure yellow shades with good fastness properties.

The reaction may alternatively be carried out in other solvents such as ortho-dichlorobenzene, trichlorobenzene or nitrobenzene.

If isophthalic acid dichloride is used instead of terephthalic dichloride a dyestuff of similar properties is obtained.

*Example 3*

88 parts of the oxaminic acid of 1-aminoanthraquinone-6-sulfodimethylamide (see Example 1, first paragraph) obtained according to the usual methods, are dissolved at 0–5° C. in 880 parts of concentrated sulfuric acid. To this solution a mixture of 30 parts of nitric acid of 63% strength and 60 parts of concentrated sulfuric acid are slowly added while stirring at the same temperature. After stirring for a further two hours at 0–5° C. the reaction mixture is poured into 4000 parts of cold water. The precipitate is filtered, and washed with water until free from acid and stirred for 2 hours in a dilute sodium carbonate solution at 90–95° C. After filtering and washing until neutral a red compound is obtained which is easily reduced in a hot aqueous sulfohydrate solution to the diamino compound. The 1:4 - diaminoanthraquinone - 6 - sulfodimethylamide thus obtained forms, after recrystallisation from chlorobenzene, dark violet crystals of metallic lustre, melting unsharply at 260° C.

285 parts of 1:4-diaminoanthraquinone-6-sulfodimethylamide are dispersed in 2500 parts of dry nitrobenzene. After the addition of 500 parts of benzoylchloride the whole is stirred at 130–135° C. for 3 hours. The dyestuff, which precipitates in the form of red needles while the reaction mass is still hot, is suction-filtered when it has cooled down and well washed with hot alcohol. It dyes cotton from an olive vat pure reddish violet shades of good fastness.

morpholide are dispersed in 800 parts of dry nitrobenzene, 11 parts of terephthalic acid dichloric acid are added, and the whole is stirred for 3 hours at 125–135° C. The dyestuff which separates on cooling as a yellow, crystalline powder is suction-filtered, well washed with boiling alcohol and dried. It dissolves in concentrated sulfuric acid with a yellow-orange coloration and dyes cotton from an olive-brown vat powerful yellow shades with excellent fastness properties. This dyestuff is represented by the formula

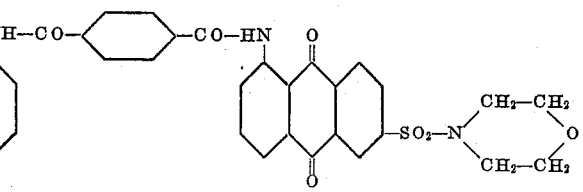

The reaction may alternatively be carried out in other solvents, such as chlorobenzene, ortho-dichlorobenzene or trichlorobenzene.

Example 4

1 - aminoanthraquinone - 6 - sulfopiperidide is made according to the method described in the first paragraph of Example 1, from 1-nitro-anthraquinone-6-sulfochloride and piperidine and subsequent reduction of the nitro-group [1-nitroanthraquinone-6-sulfopiperidide forms, after recrystallization from benzene, almost colorless needles melting at 255–256° C. (uncorrected)]. The 1 - aminoanthraquinone - 6 - sulfopiperidide crystallizes from chlorobenzene or benzene in the form of red needles melting at 238–240° C.

18.5 parts of 1-aminoanthraquinone-6-sulfopiperidide are dispersed in 900 parts of chlorobenzene, 35 parts of para-chlorobenzoylchloride are added, and the whole is boiled for 3 hours with reflux cooling. The dyestuff which crystallizes out in the form of yellow needles is suction-filtered and well washed with hot alcohol. It corresponds to the formula

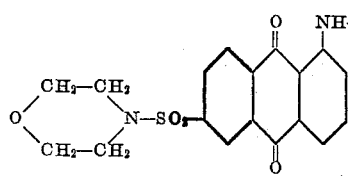

and dyes cotton from an olive brown vat very pure, strong greenish yellow shades with good fastness.

The reaction may alternatively be carried out in other solvents such as nitrobenzene, ortho-dichlorobenzene or trichlorobenzene.

Example 5

25.5 parts of 1-aminoanthraquinone-6-sulfopiperidide (see Example 4, first paragraph) are dispersed in 280 parts of dry nitrobenzene, 12 parts of para-cyanbenzoylchloride are added and the whole is stirred for 3 hours at 90–100° C. After cooling the dyestuff which has separated is suction-filtered and washed with hot alcohol. It dyes cotton from an olive brown vat pure greenish yellow shades.

The reaction may alternatively be carried out in other solvents such as chlorobenzene, ortho-dichlorobenzene or trichlorobenzene.

Example 6

37.2 parts of 1-aminoanthraquinone-6-sulfo-

If isophthalic acid dichloride is used a dyestuff is obtained which dyes somewhat less powerful shades.

1-amino-anthraquinone-6-sulfomorpholide may be obtained in the same manner as the corresponding sulfopiperidide (Example 4). It forms on recrystallization from chlorobenzene red needles.

Example 7

23 parts of 4-benzoyl-benzoic acid are dispersed in 500 parts of dry nitrobenzene and after the addition of 15 parts of thionylchloride and a small quantity of pyridine the mixture is stirred for 1½ hours at 80–90° C. 37 parts of 1-aminoanthraquinone-6-sulfomorpholide are then added and stirring is continued for 2 more hours at 120–130° C. On cooling the dyestuff separates in the form of yellow needles. It is suction-filtered, washed with boiling alcohol and dried. The dyestuff thus obtained is dissolved in concentrated sulfuric acid with a yellow coloration and dyes cotton from a black violet vat in pure greenish yellow shades with good fastness properties.

If instead of 1-amino-anthraquinone-6-sulfomorpholide other amines, such as 1-amino-anthraquinone-6-sulfopiperidide, 1-amino-anthraquinone-6-sulfodimethylamide, or 1-amino-anthraquinone-6-sulfomethylanilide are used, similar dyestuffs are obtained.

Example 8

26 parts of 1:4-diamino-anthraquinone-6-sulfopiperidide are dispersed in 350 parts of dry nitrobenzene, 50 parts of benzoylchloride are added, and the whole is stirred for 3 hours at 130–135° C. After cooling down, the dyestuff which has separated in the form of dark red needles is suction-filtered, washed with hot chlorobenzene and boiling alcohol and dried. It dissolves in concentrated sulfuric acid with a yellow coloration and dyes cotton from an olive vat red shades which become much bluer on soaping.

If the acylation is carried out with 4-methylsulfonebenzoic acid a similar dyestuff is obtained.

1:4-diamino-anthraquinone- 6 -sulfopiperidide may alternatively be prepared according to the method given in Example 3 for the preparation of 1:4 diamino-anthraquinone-6-sulfodimethylamide.

Example 9

39 parts of 1-amino-anthraquinone-6-sulfodiethanolamide are dispersed in 700 parts of dry nitrobenzene and 10.1 parts of terephthalic acid dichloride are added and the whole is stirred for 3 hours at 125–135° C. The dyestuff which separates on cooling as a yellow powder, is suction-filtered, well washed with boiling alcohol and dried. It dissolves in concentrated sulfuric acid with yellow-orange coloration and dyes cotton from an olive-brown vat pure yellow shades of very good fastness. This dyestuff corresponds to the formula

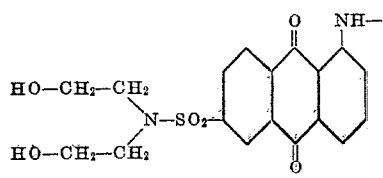

If amino-anthraquinone-sulfodiethanolamides are acylated with an excess of acid halides (for instance benzoylchloride or para-chlorobenzoylchloride), the two OH-groups are also esterified.

1-amino-anthraquinone-6-sulfodiethanolamide may be prepared by a method which is analogous to that by which 1-amino-anthraquinone-6-sulfodimethylamide (Example 1) is prepared; when recrystallized from nitrobenzene the compound forms red needles.

Example 10

65 parts of bis-(1-amino-anthraquinone-6-sulfo)-piperazide are dispersed in 2000 parts of dry nitrobenzene and after the addition of 120 parts of benzoylchloride the whole is kept boiling for 3 hours while stirring. The dyestuff, which separates in the form of yellow crystals while the reaction mass is still boiling, is suction filtered after cooling down, well washed with nitrobenzene and boiling alcohol and dried. It dissolves in concentrated sulfuric acid with a red coloration and dyes cotton from a red-brown vat powerful greenish yellow shades of very good fastness. This dyestuff is represented by the formula

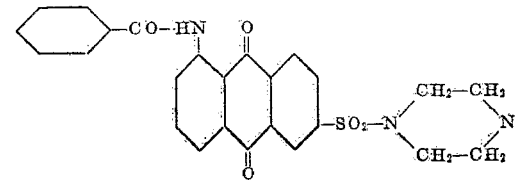

If instead of benzoylchloride, para-chlorobenzoylchloride is used, a similar dyestuff is obtained which dyes cotton in somewhat more reddish shades.

The bis-(1-amino-anthraquinone-6-sulfo)-piperazide mentioned above may be obtained as follows:

To a solution of 105.5 parts of 1-nitro-anthraquinone-6-sulfochloride and 24 parts of pyridine in 3800 parts of acetone, a solution of 30 parts of piperazine (44%) in 600 parts of acetone is slowly added drop by drop while vigorously stirring at room temperature. When this addition is complete, stirring is continued for 4 hours at 35–40° C. After cooling the solution is suction-filtered and the residue is washed with hot water and dried. The nitro groups may be easily reduced by means of an aqueous sulfohydrate solution. The diamine is difficultly soluble in almost any solvent.

Example 11

20 parts of diphenyl-4-carboxylic acid are dispersed in 350 parts of dry nitrobenzene and after the addition of 15 parts of thionylchloride and a small quantity of pyridine the whole is stirred at 90–100° C. for 1½ hours. 37 parts of 1-aminoanthraquinone-6-sulfopiperidide are then added and stirring is continued for 2 more hours at 120–130° C. The dyestuff which separates on cooling in the form of yellow needles is suction-filtered, washed with boiling alcohol and dried. It dissolves in concentrated sulfuric acid with a yellow coloration and dyes cotton from a brown

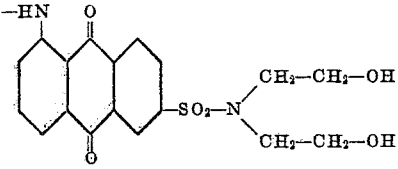

red vat greenish yellow shades.

Similar dyestuffs are obtained if 1-aminoanthraquinone-6-sulfodimethylamide, 1-amino-anthraquinone-6-sulfomethylanilide and 1-amino-anthraquinone-6-sulfomorpholide are acylated by means of diphenyl-4-carboxylic acid halides.

Example 12

2 parts of the dyestuff obtained according to Example 2 are slurried in 200 parts of water and after the addition of 8 parts by volume of caustic soda solution of 36° Bé. and 4 parts of sodium hydrosulfite are vatted at 50–60° C. This stock vat is added to a dyebath containing, in 3000 parts of water, 7 parts by volume of caustic soda solution of 36° Bé. and 4 parts of sodium hydrosulfite. 100 parts of well wetted cotton are entered at 25° C. After 15 minutes, 60 parts of sodium chloride are added. The temperature is raised to 30° C. and dyeing is effected for 1 hour at this temperature. The cotton is squeezed, oxidized in the air, rinsed in cold water, acidified, rinsed again, and, if desired, soaped. It is dyed in powerful pure yellow shades.

It is obvious that while the preferred embodiments of the present invention have been particularly described above, changes and alterations may be made without departing from the spirit thereof. Thus, if desired, the sulfonic acid amide groups may contain only one alkyl substituent attached to the nitrogen atom or even none, the said groups may occupy a β-position of the benzene nucleus in the anthraquinone radical which carries an acylamino group, but preferably not in 1 and 2-position relatively to each other. The acyl radical of the acylamino group or groups may be an aliphatic acyl radical such as an acetyl, propionyl-valerianyl or even higher aliphatic acyl radical, or a heterocyclic acyl radical, such as the radical of a pyridine carboxylic or quinoline carboxylic acid such as described in our co-pending patent application Ser. No. 786,546, filed November 17, 1947 (now U. S. Patent No. 2,506,023). Furthermore where the relative position of the sulfamide group and the acylamino group is 1:6 in the above examples, a relative position of 1:7 may be chosen instead, or mixtures containing compounds with both relative positions.

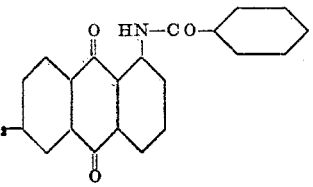

What we claim is:

1. A vat dyestuff corresponding to the general formula

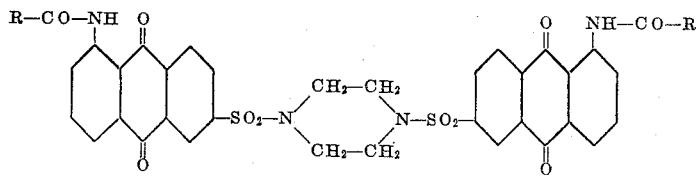

wherein R—CO— stands for the radical of a benzene monocarboxylic acid.

2. A vat dyestuff corresponding to the general formula

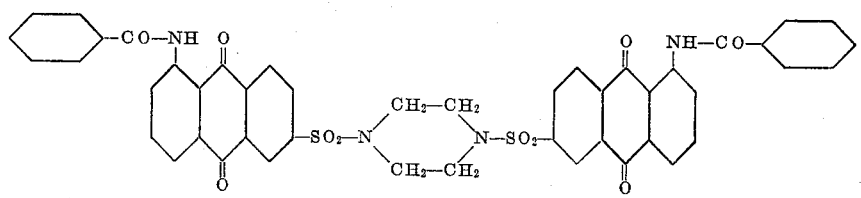

wherein X stands for a member selected from the group consisting of halogen and hydrogen.

3. The vat dyestuff of the formula

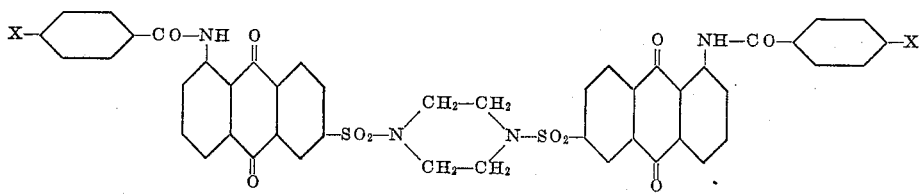

4. The vat dyestuff of the formula

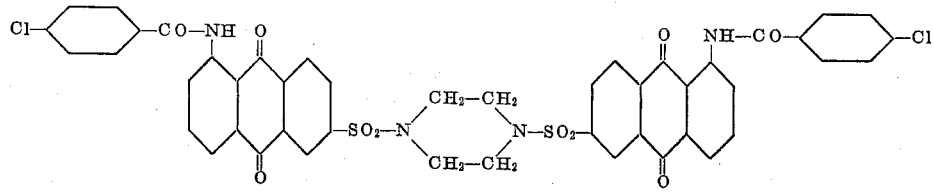

WALTER JENNY.
WALTER KERN.

No references cited.